(12) United States Patent
Sharp

(10) Patent No.: US 7,106,509 B2
(45) Date of Patent: Sep. 12, 2006

(54) FILTER FOR ENHANCING VISION AND/OR PROTECTING THE EYES AND METHOD OF MAKING A FILTER

(75) Inventor: Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 205 days.

(21) Appl. No.: 10/655,858

(22) Filed: Sep. 5, 2003

(65) Prior Publication Data

US 2004/0114242 A1 Jun. 17, 2004

Related U.S. Application Data

(60) Provisional application No. 60/408,754, filed on Sep. 6, 2002.

(51) Int. Cl.
G02B 27/28 (2006.01)
G02B 5/30 (2006.01)

(52) U.S. Cl. .................. 359/498; 359/497; 359/501; 359/485; 351/49; 351/163

(58) Field of Classification Search ............ 351/158, 351/588, 163, 49; 359/588, 498, 501, 502, 359/493, 497, 485
See application file for complete search history.

(56) References Cited

U.S. PATENT DOCUMENTS

| | | | | |
|---|---|---|---|---|
| 2,184,999 A | * | 12/1939 | Land et al. | 359/498 |
| 4,595,262 A | * | 6/1986 | Ogle | 359/409 |
| 4,826,286 A | * | 5/1989 | Thornton, Jr. | 359/588 |
| 5,382,986 A | * | 1/1995 | Black et al. | 351/158 |
| 5,751,384 A |   | 5/1998 | Sharp | |
| 5,774,202 A | * | 6/1998 | Abraham et al. | 351/177 |
| 6,334,680 B1 |  | 1/2002 | Larson | |

OTHER PUBLICATIONS

G.D.Sharp and J.R.Birge, "Retarder stack technology for color manipulation", SID symposium, vol. 30, pp. 1072-75(1999).*
W. A. Thornton; Luminosity of Color-Rendering Capability of White Light; Journal of the Optical Society of America; Sep. 1971; 1155-1163; vol. 61, No. 9.
W. A. Thornton; Color-Discrimination Index; Journal of the Optical Society of America; Feb. 1972; 191-194; vol. 62, No. 2.
W. A. Thornton; Three-Color Visual Response; Journal of the Optical Society of America; Mar. 1972; 457-459; vol. 62, No. 3.
Sharp et al., Retarder Stack Technology for Color Manipulation, SID Symposium, vol. 30, p. 1072 (Apr. 1999).

* cited by examiner

*Primary Examiner*—Leonidas Boutsikaris
(74) *Attorney, Agent, or Firm*—Baker & McKenzie LLP

(57) ABSTRACT

The selective filtering of light by polarization interference may be used to enhance vision and/or protect eyes from harmful light rays. For example, such filtering may be used in sunglasses, color corrective eyewear or protective eyewear. The selective filtering of incident light may provide any desired spectral transmission (including visible light and light not visible to the eye) and is performed by a pair of polarizing elements that sandwich a retarder stack. The filtering structure may be formed by multi-layer polarizing structures and may be formed by fabricating sheet laminates that are die cut to form inexpensive laminates. The laminates may be flat or curved in one (e.g., wrap-around) or more dimensions.

51 Claims, 2 Drawing Sheets

FILTER FOR ENHANCING VISION AND/OR PROTECTING THE EYES AND METHOD OF MAKING A FILTER

PRIORITY CLAIM AND RELATED APPLICATION

The present application claims priority from U.S. Provisional Application entitled "Filter for Enhancing Human Vision and/or Protecting the Eyes and Method of Making a Filter," Ser. No. 60/408,754 filed Sep. 6, 2002, having Gary D. Sharp, as inventor, and having as assignee ColorLink, Inc., the assignee of the present application. This provisional application is incorporated herein by reference in its entirety for all purposes.

FIELD OF THE INVENTION

The present invention relates generally to filters with light filtering to enhance vision and/or protect the eyes and to a method of making the filters.

BACKGROUND

Sunglasses, which suppress glare, may be made with films having moderate neutral polarizing efficiency. Sunglasses, which selectively filter transmitted light, may be made with multilayer thin-films, diffractive structures that selectively reflect light or dyes with chromatic absorption. Most of these sunglasses have spectral profiles with a small first derivative such that the slope at any point in the transmission spectrum is shallow. Such spectra are generally suitable to produce a desired hue and photopic transmission. Other sunglasses have spectral profiles with more aggressive slopes. For example, certain blue blocking sunglasses made from suitable dyes strongly suppress blue transmission, improving sharpness at the expense of color balance. Other sunglasses block one band of inter-primary light (500 nm cyan or 580 nm yellow light) and may partially block the other band of inter-primary light with rare-earth doped glass or with multi-layer coating technology. Unfortunately, rare-earth doped sunglasses have a fixed spectrum and multi-layer coating sunglasses may have an objectionable image due to light reflection. Multi-layer sunglasses may also suffer from angle sensitivity effects.

Glasses including dielectric mirrors to enhance the vision of those with color vision deficiency are known. As with other multiple layer coatings, glasses with dielectric mirrors may have an objectionable image due to light reflection and may suffer from angle sensitivity effects.

Retarder stacks as described in the present application are N linear retarders that have been designed using Finite Impulse Response (FIR) filter techniques, wherein the impulse response of the N retarders generate at least N+1 output impulses from a polarized impulse input. As such, a placing retarder stacks between neutral polarizers forms FIR filters, and these FIR filters can be designed using standard signal processing methods. The amplitude of each responsive, output impulse is determined by the orientations of the retarders (and the analyzing polarizer) relative to the input polarization of the input impulse. Algorithms are used to determine the orientations of the retarder films and the analyzing polarizers so as to satisfy a prescribed impulse response. Further details of the design approaches for the described retarder stacks are described in greater detail in U.S. patent application Ser. No. 09/754,091, which is hereby incorporated by reference herein.

SUMMARY OF THE INVENTION

Disclosed embodiments provide an optical filter including an input polarizing element, an output polarizing element, and a retarder stack between the input polarizing element and the output polarizing element. The input polarizing element, the output polarizing element, and the retarder stack, filter at least one inter-primary band of light. Alternatively, at least two inter-primary bands of light are filtered and the input polarizing element, the output polarizing element, and the retarder stack, filter light so as to maintain a color neutral appearance. The eyewear may be a pair of sunglasses or a visor.

Disclosed embodiment also provide an optical filter including an input polarizing element, an output polarizing element, and a retarder stack between the input polarizing element and the output polarizing element. The input polarizing element, the output polarizing element, and the retarder stack, filter light so as to improve color deficient vision.

Further provided in the disclosed embodiments is an optical filter including an input polarizing element, an output polarizing element, and a retarder stack between the input polarizing element and the output polarizing element. The input polarizing element, the output polarizing element, and the retarder stack, filter light so as to protect the eyes from harmful light rays such as laser light rays.

This application further describes an optical filter including an input polarizing element, an output polarizing element, and a retarder stack between the input polarizing element and the output polarizing element. The input polarizing element, the output polarizing element, and the retarder stack, filter light such that at least two bands of light are substantially attenuated Also described is an optical filter for enhancing human or animal vision and/or protecting the eyes from harmful light rays that includes a pair of polarizing elements that sandwich a retarder stack. The optical filter may have a spectral transmission that enhances color vision, corrects for a color vision deficiency and/or protects the eyes from harmful light rays. The optical filter may be a double-notch filter that blocks inter-primary light to maintain a color neutral appearance while enhancing the saturation of colored objects. The optical filter may be a lens, a pair of sunglasses, corrective eyewear, protective eyewear, and visor.

Further embodiments provide a method of filtering light in eyewear for color vision enhancement, color vision deficiency compensation, or attenuation of harmful light rays including polarizing input light to form polarized light, rotating the polarization of the polarized light to form rotated light, and analyzing the rotated light. The rotation of light is determined in accordance with one or both of predetermined lighting conditions of an environment and a person's vision.

Included in the described embodiments is an optical filter including an input polarizing element, an output polarizing element, and a retarder stack between the input polarizing element and the output polarizing element. The retarder stack, the input polarizing element and the output polarizing element have a light transmittancy at 450 nm, 540 nm and 610 nm that is greater than a light transmittancy at 500 nm or 580 nm.

Further described is an optical filter including an input polarizing element, an output polarizing element, and a retarder stack between the input polarizing element and the output polarizing element. The input polarizing element, the output polarizing element, and the retarder stack, filter light to substantially reduce at least one near zero chromaticity response band of light.

DETAILED DESCRIPTION

Figure 1:
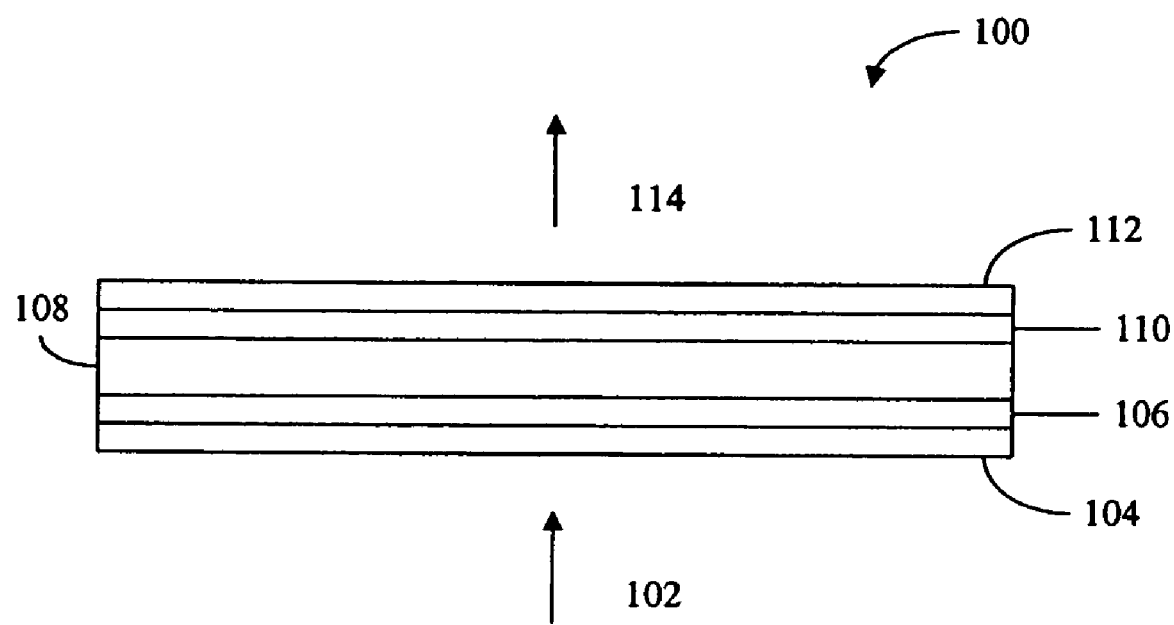
FIG. 1 illustrates an exemplary filter for eyewear based on polarization interference according to an embodiment of the present invention.

The selective filtering of light by polarization interference may be used to enhance human or animal vision and/or protect the eyes from harmful light rays. For example, such filtering may be used in sunglasses, color corrective eyewear or protective eyewear. The selective filtering of incident light may provide any desired spectral transmission (including visible light and light not visible to the human or animal eye) and is performed by a pair of polarizing elements that sandwich a retarder stack. The filtering structure may be formed by multi-layer polarizing structures and may be formed by fabricating sheet laminates that are die cut to form inexpensive laminates. The laminates may be flat or curved in one (e.g., wrap-around) or more dimensions.

One exemplary embodiment of the present invention provides an optical filter for eyewear with a laminated polarizing filter having a spectral transmission that enhances color vision via polarization interference. For example, single or double-notch filters block inter-primary light (580 nm yellow and/or 500 nm cyan) to maintain a color neutral appearance (e.g., white objects appear white) while enhancing the saturation of colored objects. This selective filtration reduces the overall transmission while maintaining a neutral appearance. Additionally, glare may be filtered by vertically aligning the initial polarizer. Thus, this exemplary embodiment acts just like common sunglasses while enhancing the appearance and contrast of colored objects.

Another exemplary embodiment of the present invention provides eyewear with a laminated polarizing filter that improves the color vision of individuals with color blindness, color vision deficiency, or high sensitivity to one or more colors. Polarization interference may be used to provide a color balance function in the presence of reduced sensitivity to one or more additive primary colors (e.g., red or green). Specifically, the improvement in color vision is achieved by adjusting the light transmittancy at bands or notches that correspond to the wavelengths where the eye's chromatic response falls nearly to zero. These near-zero chromatic responses occur in the blue-green near 500 nm, in the yellow near 580 nm, in the violet at or beyond 400 nm and in the deep red at or beyond 700 nm. Conversely, the wavelengths near 450, 540, and 610 nm have the best chromatic response. Thus, a filter resulting in a relatively high light transmittancy at 450 nm, 540 nm, and 610 nm, and a relatively low light transmittancy at 500 nm and at 580 nm will maintain color balance while producing color enhancement. The filter can substantially attenuate the light transmittancy at 500 nm and at 580 nm to maintain the color balance while producing color enhancement. Optionally, low transmission bands or notches in the violet at or beyond 400 nm range and/or in the deep red at or beyond 700 nm may be included for eye protection without substantially adversely impacting the color balance or color enhancement functionalities otherwise provided. Some vision problems include high sensitivity to one or more bands of light. In such cases, the polarization interference can be used to adjust the light transmittancy at those bands without impacting the color balance or color enhancement functionalities otherwise provided. The color balance and color enhancement functionality may be combined in a single retarder stack according to the present invention or may be provided by separate stacks. The laminated polarizing filter may have a lens geometry or other suitable geometry, and may include other functionalities such as protection from high light levels.

Another exemplary embodiment of the present invention provides wavelength selective polarizing filter for active (sports) eyewear that enhances performance and comfort in applications with more defined input parameters. Such applications include fishing, SCUBA diving, golfing, and skiing and others.

Another exemplary embodiment of the present invention provides wavelength selective polarizing filters in eyewear for eye protection that enhances performance and comfort in applications with more defined input parameters. Such applications include laser laboratory goggles, laser blocking visors or canopies for helmet and others. Other environments and uses are also possible. To provide such eye protection that enhances performance and comfort, an initial spectral profile and a desired spectral profile for eyes are determined. Then, an appropriate filter can be designed to compensate for the difference between the initial spectral profile and the desired spectral profile. An exemplary method of generating desired filtering spectrum can be found in U.S. patent application Ser. No. 09/754,091 which is hereby incorporated by reference herein.

FIG. 1 illustrates an exemplary filter 100 based on polarization interference according to an embodiment of the present invention. Incident light 102 is coupled into the filter 100 by an antireflective film 104. The incident light 102 is then polarized by an input polarizer 106 for transmission through a retarder stack 108. The retarder stack 108 wavelength selectively rotates the polarization of the incident light 102 such that an analyzing polarizer 110 will produce a desired filtering effect upon the incident light 102. Another antireflective film 112 then couples out the filtered light 114. The input polarizer 106 may be aligned vertically to filter glare. The input polarizer 106 and the analyzing polarizer 110 may be parallel or perpendicular to each other. Alternatively, the input polarizer 106 and the analyzing polarizer 110 may have some other orientation relative to each other. The retarder stack 108, positioned between the input polarizer 106 and analyzing polarizer 110, selectively manipulates the polarization such that, the analyzing polarizer 110 controls the transmission at each wavelength. The power transmission at a particular wavelength depends upon the projection of the state of polarization (SOP) onto the polarizer transmission axis. This projection depends upon the orientation of the polarization ellipse, and the ellipticity.

Figure 2:
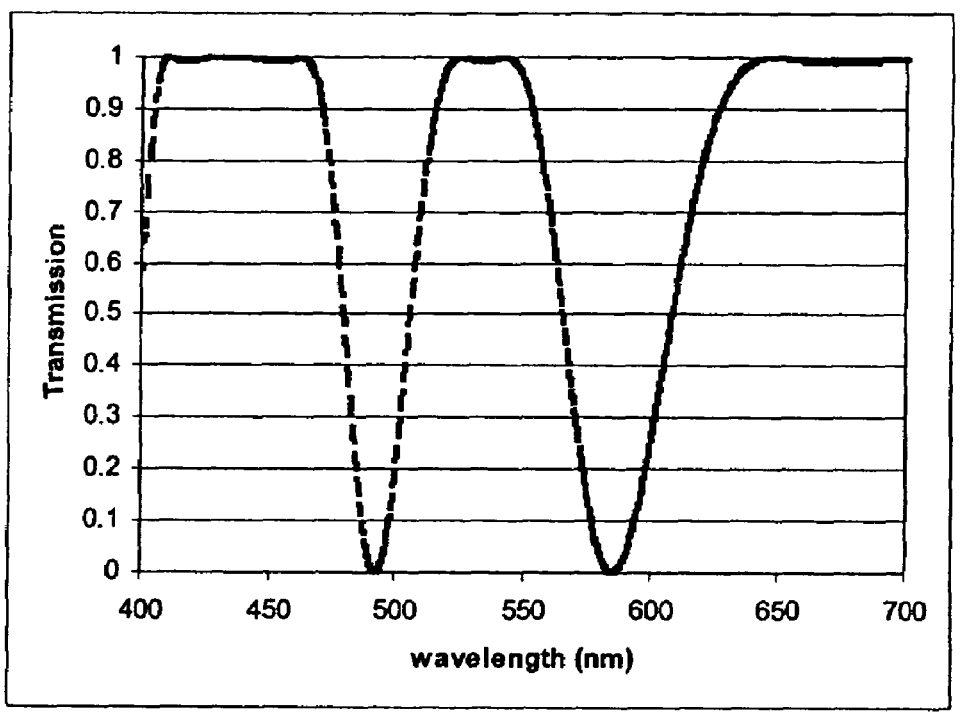
FIG. 2 illustrates the transmission spectrum of a seven-layer stack based on a retardation film with 2.0 waves of retardation at 432 nm.

FIG. 2 illustrates the transmission spectrum of a seven-layer stack based on a retardation film with 2.0 waves of retardation at 432 nm. This is a color enhancement filter, which transmits the primary bands (e.g., red, green and blue), while suppressing the cyan and yellow portions of the spectrum. In this parallel polarizer design, the retardation film has a full-wave retardance in the blue and red bands, so the flat response is obtained using a stack design that preserves this behavior throughout the magenta portion of the spectrum. Conversely, the green band is centered in the half-wave band, where more pronounced incremental polarization transformations occur. Ultimately, the half-wave band is returned to the input SOP, with a resultant flattening of the passband about the half-wave wavelength. This series of transformations converts the cyan/yellow portions of the spectrum into the orthogonal SOP such that they are absorbed by the analyzing polarizer.

Figure 3:
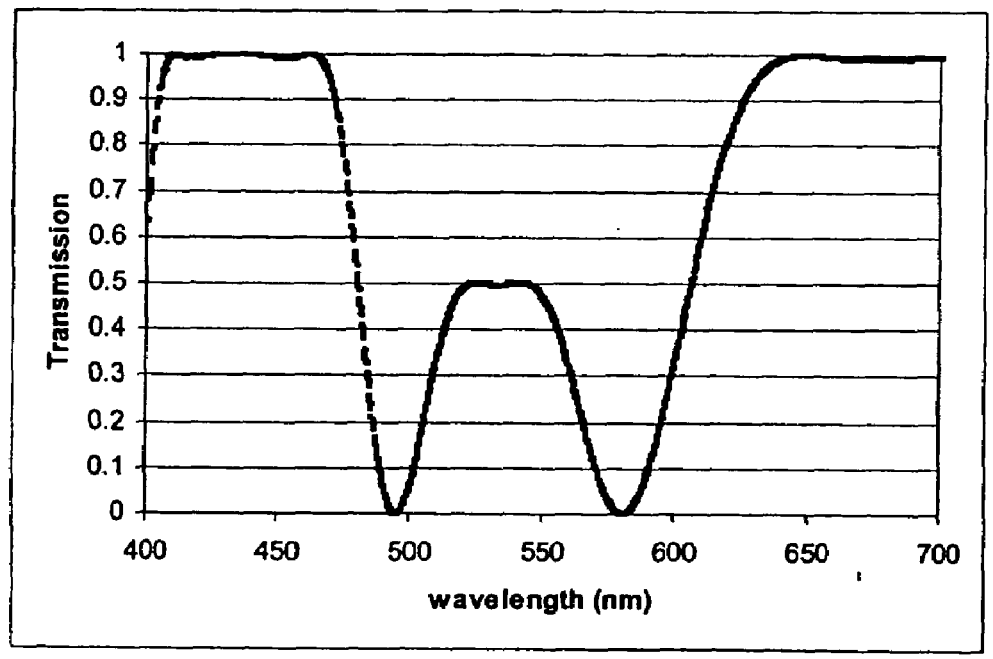
FIG. 3 illustrates transmission spectrum that shows both notching and green suppression in eyewear with a design similar to that of FIG. 2.

FIG. 3 illustrates transmission spectrum that shows both notching and green suppression in eyewear filter with a design similar to that of FIG. 2, which may be used to compensate for color vision deficiency. In FIG. 3, the green passband is fairly flat, but the peak transmission is selected to be 50%. Arbitrary suppression of a particular primary is achieved by designing a stack that projects prescribed amplitude onto the analyzing polarizer transmission axis.

Retarder films that form the retarder stack 108 may be fabricated from polymers such as polycarbonate, cellulose diacetate, polysulphone or polyvinyl alcohol, or other suitable materials. Fewer laminations may be used when the chromatic effects are preferably produced using a base film with significant retardation. Biaxial stretched (Nz=0.5) films may be used to reduce angular color shift effects.

Polarizer films may be protected by an optional protection film such as, cellulose triacetate. The polarizing films may be bonded to the retarder stack using conventional methods, solvent bonding as is described in copending U.S. patent application Ser. No. 09/559,267, or any other suitable method. External coatings, such as broadband antireflection coatings may be applied using vacuum coating, wet coating, or any other suitable method. Antiglare coatings also may be applied in order to reduce unwanted specular reflection at the air-lens interface that produces an objectionable image.

Fabrication of a filter according to the present invention may include laminates formed using pinch rollers in conjunction with pressure sensitive adhesives (PSAs), acrylics, urethanes, silicones, or solvent bonding methods. Flat stock may be generated using a pinch roller with a planar translation stage. Curvature in one dimension may be obtained by laminating it onto a rotating drum with diameter selected to achieve the desired curvature. Lamination with two-dimensional curvature can be more challenging, due to spectral distortion that occurs via stresses formed when the film is kinked. Alternatively, the laminated sheet may be cast in a polymer substrate to achieve other filter geometries. For example, the filter may be cast between two substrates with common curvature to form a curved lens. Filters formed with lens geometries may be die cut from planar/curved sheet stock and mounted into frames. Other methods to form lens geometries may also be used.

The input polarizer 106 and analyzing polarizer 110 may be color polarizers. The filters of the present invention may include other elements such as support substrates, protective layers or other elements. Although several embodiments and advantages of the present invention have been described in detail, it should be understood that changes, substitutions, transformations, modifications, variations, permutations and alterations might be made therein without departing from the teachings of the present invention.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. An optical filter for vision comprising:
   an input polarizing element;
   an output polarizing element; and
   a retarder stack between the input polarizing element and the output polarizing element, the retarder stack comprising $N \geq 2$ retarder films;
   wherein the input polarizing element, the output polarizing element, and the retarder stack are at least partially positioned in a field of view and are collectively designed to comprise an FIR filter, and thereby are operable to generate at least N+1 spatially offset light pulses in response to a linearly polarized light impulse input, the FIR filter operable to substantially filter at least one band of light,
   wherein the optical filter is configured for vision.

2. An optical filter according to claim 1, wherein
   wherein the optical filter is configured for human vision; and
   the input polarizing element, the output polarizing element, and the retarder stack are adapted to be positioned at least partially in a human's field of view.

3. An optical filter according to claim 1, wherein
   the optical filter is configured for animal vision; and
   the input polarizing element, the output polarizing element, and the retarder stack are adapted to be positioned at least partially in an animal's field of view.

4. An optical filter according to claim 1, wherein the at least one band of light is an inter-primary band of light.

5. An optical filter according to claim 1, wherein the at least one band of light has a wavelength that is smaller than or equal to about 400 nm.

6. An optical filter according to claim 1, wherein the at least one band of light has a wavelength that is greater than or equal to about 700 nm.

7. An optical filter according to claim 1, wherein the at least one band of light has a wavelength of about 500 nm.

8. An optical filter according to claim 1, wherein the at least one band of light has a wavelength of about 580 nm.

9. An optical filter according to claim 1, wherein the FIR filter is operable to filter at least two inter-primary bands of light.

10. An optical filter according to claim 1, wherein the input polarizing element, the output polarizing element, and the retarder stack filter light so as to maintain a color neutral appearance.

11. An optical filter according to claim 1, wherein the optical filter is one of a pair of sunglasses, a canopy for a helmet, or a visor.

12. An optical filter for vision comprising:
an input polarizing element;
an output polarizing element; and
a retarder stack between the input polarizing element and the output polarizing element, the retarder stack comprising $N \geq 2$ retarder films;
wherein the input polarizing element, the output polarizing element, and the retarder stack are at least partially positioned in a field of view and collectively comprise an FIR filter, and are thereby are operable to generate at least N+1 spatially offset light pulses in response to a linearly polarized light impulse input, the FIR filter operable to substantially filter light to improve color deficient vision.

13. An optical filter according to claim 12, wherein
the optical filter is configured for human vision; and
the input polarizing element, the output polarizing element and the retarder stack, are adapted to be positioned at least partially in a human's field of view.

14. An optical filter according to claim 12, wherein
the optical filter is configured for animal vision; and
the input polarizing element, the output polarizing element, and the retarder stack are adapted to be positioned at least partially in an animal's field of view.

15. An optical filter according to claim 12, wherein the light is substantially filtered at wavelengths of about 500 nm and about 580 nm.

16. An optical filter for vision comprising:
an input polarizing element;
an output polarizing element; and
a retarder stack between the input polarizing element and the output polarizing element, the retarder stack comprising $N \geq 2$ retarder films;
wherein the input polarizing element, the output polarizing element, and the retarder stack are at least partially positioned in a field of view and are collectively designed to comprise an FIR filter, and thereby are operable to generate at least N+1 spatially offset light pulses in response to a linearly polarized light impulse input, the FIR filter operable to substantially filter harmful light rays.

17. An optical filter according to claim 16, wherein
the optical filter is configured for human vision; and
the input polarizing element, the output polarizing element, and the retarder stack are adapted to be positioned at least partially in a human's field of view.

18. An optical filter according to claim 16, wherein
the optical filter is configured for animal vision; and
the input polarizing element, the output polarizing element, and the retarder stack are adapted to be positioned at least partially in an animal's field of view.

19. An optical filter according to claim 16, wherein the harmful light rays are laser light rays.

20. An optical filter for vision comprising:
an input polarizing element;
an output polarizing element; and
a retarder stack between the input polarizing element and the output polarizing element, the retarder stack comprising $N \geq 2$ retarder films;
wherein the input polarizing element, the output polarizing element, and the retarder stack are at least partially positioned in a field of view and are collectively designed to comprise an FIR filter, and thereby are operable to generate at least N+1 spatially offset light pulses in response to a linearly polarized light impulse input, the FIR filter operable to substantially filter light such that at least two bands of light are substantially attenuated.

21. An optical filter according to claim 20, wherein
the optical filter is configured for human vision; and
the input polarizing element, the output polarizing element, and the retarder stack are adapted to be positioned at least partially in a human's field of view.

22. An optical filter according to claim 20, wherein
the optical filter is configured for animal vision; and
the input polarizing element, the output polarizing element, and the retarder stack are adapted to be positioned at least partially in an animal's field of view.

23. An optical filter according to claim 20, wherein a power spectrum of the input polarizing element, the output polarizing element, and the retarder stack is selected such that color saturation is increased.

24. An optical filter according to claim 23, where the power spectrum is color neutral.

25. An optical filter according to claim 23, wherein the power spectrum is selected to improve color deficient vision.

26. An optical filter according to claim 25, wherein the color deficient vision is color blindness.

27. An optical filter according to claim 23, wherein the optical filter is a lens.

28. An optical filter for enhancing vision and/or protecting eyes from harmful light rays comprising a pair of polarizing elements that sandwich a retarder stack, the retarder stack comprising $N \geq 2$ retarder films, the retarder stack and polarizing elements at least partially positioned in a field of view and collectively designed to comprise an FIR filter, and thereby operable to generate at least N+1 spatially offset light pulses in response to a linearly polarized light impulse input, wherein the FIR filter has a spectral transmission providing at least one of:
color vision enhancement,
color vision deficiency compensation, or
attenuation of harmful light rays.

29. An optical filter according to claim 28, wherein
the optical filter is configured for human vision; and
the pair of polarizing elements that sandwich the retarder stack is at least partially positioned in a human's field of view.

30. An optical filter according to claim 28, wherein
the optical filter is configured for animal vision; and
the pair of polarizing elements that sandwich the retarder stack is at least partially positioned in an animal's field of view.

31. An optical filter according to claim 28, wherein the FIR filter is a double-notch filter that blocks inter-primary light.

32. An optical filter according to claim 28, wherein the FIR filter is color neutral.

33. An optical filter according to claim 28, wherein the FIR filter increases color saturation.

34. An optical filter according to claim 28, wherein the optical filter is one of a lens, a pair of sunglasses, corrective eyewear, protective eyewear, or a visor.

35. An optical filter for vision comprising:
an input polarizing element;
an output polarizing element; and
a retarder stack between the input polarizing element and the output polarizing element, the retarder stack comprising $N \geq 2$ retarder films;
wherein the input polarizing element, the output polarizing element, and the retarder stack are collectively designed to comprise an FIR filter, and thereby operable to generate at least N+1 spatially offset light pulses in response to a linearly polarized light impulse input, and are at least partially positioned in a field of view, and filter light to substantially reduce at least one near zero chromaticity response band of light.

36. An optical filter according to claim 35, wherein
the optical filter is configured for human vision; and
the input polarizing element, the output polarizing element, and the retarder stack are adapted to be positioned at least partially in a human's field of view.

37. An optical filter according to claim 35, wherein
the optical filter is configured for animal vision; and
the input polarizing element, the output polarizing element, and the retarder stack are adapted to be positioned at least partially in an animal's field of view.

38. An optical filter according to claim 35, wherein the input polarizing element, the output polarizing element, and the retarder stack, collectively filter light to substantially reduce at least two near zero chromaticity response bands of light.

39. An optical filter according to claim 35, wherein the input polarizing element, the output polarizing element, and the retarder stack, filter light to substantially reduce at least three near zero chromaticity response bands of light.

40. An optical filter for vision comprising:
an input polarizing element;
an output polarizing element; and
a retarder stack between the input polarizing element and the output polarizing element, the retarder stack comprising $N \geq 2$ retarder films;
wherein the retarder stack, the input polarizing element, and the output polarizing element are collectively designed to comprise an FIR filter, and thereby are operable to generate at least N+1 spatially offset light pulses in response to a linearly polarized light impulse input and are at least partially positioned in a field of view, and collectively have a light transmittancy at 450 nm, 540 nm and 610 nm that is greater than a light transmittancy at 500 nm or 580 nm.

41. An optical filter according to claim 40, wherein
the optical filter is configured for human vision; and
the input polarizing element, the output polarizing element, and the retarder stack are adapted to be positioned at least partially in a human's field of view.

42. An optical filter according to claim 40, wherein
the optical filter is configured for animal vision; and
the input polarizing element, the output polarizing element, and the retarder stack are adapted to be positioned at least partially in an animal's field of view.

43. A method for improving a person's or animal's vision comprising:
determining an initial spectral profile of the person's or animal's vision;
determining a desired spectral profile of the person's or animal's vision; and
providing eyeware for the person or the animal, wherein the eyeware comprises an input polarizing element, an output polarizing element, and a retarder stack, configured to substantially filter at least one band of light to compensate for the difference between the desired spectral profile and the initial spectral profile,
wherein the retarder stack comprises $N \geq 2$ retarder films,
wherein the input polarizing element, the output polarizing element, and the retarder stack are at least partially positioned in a field of view and are collectively designed to comprise an FIR filter, and thereby are operable to generate at least N+1 spatially offset light pulses in response to a linearly polarized light impulse input.

44. A method according to claim 43, wherein the input polarizing element, the output polarizing element, and the retarder stack, substantially filter at least one inter-primary band of light.

45. A method according to claim 43, wherein the eyewear has a light transmittancy at 450 nm, 540 nm and 610 nm that is greater than a light transmittancy at 500 nm or 580 nm.

46. A method according to claim 43, wherein the eyewear is a wavelength selective polarizing filter.

47. A method according to claim 43, further comprising:
selecting a power spectrum of the input polarizing element, the output polarizing element, and the retarder stack, such that color saturation is increased.

48. A method according to claim 47, wherein the power spectrum is color neutral.

49. A method according to claim 47, where the power spectrum is selected to improve color deficient vision of the person or the animal.

50. A method according to claim 43, wherein the input polarizing element, the output polarizing element, and the retarder stack, substantially filter light so as to protect the person's or the animal's vision from harmful light rays.

51. A method according to claim 43, wherein the input polarizing element, the output polarizing element, and the retarder stack, filter light to substantially reduce at least one near zero chromaticity response band of light.

* * * * *